United States Patent [19]
O'Donnell

[11] 3,858,967
[45] Jan. 7, 1975

[54] METHOD AND APPARATUS FOR PROVIDING INDEXING CODES ON MOVIE FILM AND ASSOCIATED MAGNETIC TAPE

[75] Inventor: Leopold Henry O'Donnell, Montreal, Quebec, Canada

[73] Assignee: Her Majesty the Queen in Right of Canada as represented by the Secretary of State, Ottawa, Canada

[22] Filed: June 19, 1973

[21] Appl. No.: 371,492

Related U.S. Application Data

[63] Continuation-in-part of Ser. No. 320,306, Jan. 2, 1973, abandoned.

[30] Foreign Application Priority Data
Dec. 29, 1972 Canada.................................. 160257

[52] U.S. Cl....................... 352/38, 352/39, 352/84, 354/105, 354/109
[51] Int. Cl. ........................................... G03b 41/00
[58] Field of Search ............... 352/5, 12, 20, 92, 38, 352/39, 84; 354/105, 109

[56] References Cited
UNITED STATES PATENTS
3,515,470  6/1970  Browder .............................. 352/92

*Primary Examiner*—Samuel S. Matthews
*Assistant Examiner*—Russell E. Adams
*Attorney, Agent, or Firm*—Alan Swabey; Robert E. Mitchell

[57] ABSTRACT

The invention relates to a novel method for providing time index information on the edge of a film in a movie camera and on a magnetic tape for sound recording to permit the later synchronization of the tape and the film. The invention also relates to an apparatus for carrying out the method. In accordance with the invention, the camera comprises at least a single light beam which can expose the film edge to record the indexing information. At the same time, the indexing information is recorded on the tape via a tape head which is fed from an audio oscillator. The oscillator and the light source are driven by a generator so as to produce identical binary codes on both the film and the tape, and the code indicates the elapsed time in BCD. In accordance with the invention, the bit rate is half the frame rate so that each bit occupies two frames of the film. In addition, the invention requires that no more than one full frame of the film edge is exposed in each bit. Because of this, the light-on time does not have to be synchronized with the film stationary time and clear and meaningful codes are available on the film edge at all times. In a preferred embodiment, a plurality of light beams, preferably four, are disposed across the film to produce four bits in every two frames. The four track system can produce four parallel line exposures running in the direction of travel of the film in every two frames.

12 Claims, 11 Drawing Figures

METHOD AND APPARATUS FOR PROVIDING INDEXING CODES ON MOVIE FILM AND ASSOCIATED MAGNETIC TAPE

CROSS-REFERENCE TO RELATED APPLICATION

This application is a continuation-in-part of U.S. application, Ser. No. 320,306, filed Jan. 2, 1973, now abandoned.

BACKGROUND OF THE INVENTION

1. Field of the Invention

This invention relates to a method for recording indexing information on movie film strips and corresponding sound recording tapes, and to apparatus for carrying out the invention. More specifically, this invention relates to a method for recording digital time-indexing information on the film strips and corresponding tapes, and to apparatus for carrying out the invention.

2. Description of the Prior Art

Present day lightweight film cameras and associated sound equipment can operate without interconnecting cables as each unit has its own speed control and independent battery supply. This offers production crews flexibility and mobility when shooting sync sound and has tremendously widened the scope of documentary film making. Up to now, however, an equally efficient scene identification system has been lacking. Traditional slating of picture and sound recording materials with the conventional clapperboard and scene number announcement is no longer practical in many production situations. Internal slate lights in some cameras arranged to match start or end beeps on the sound recording require a cable connection or a radio link between each camera and each recorder. The more elaborate systems using this method feature binary recording of shot numbers. Now that light emitting diodes (LEDS) are so readily available, it can be expected that they will be substituted for the present incandescent slating lights that are standard equipment in many cameras now. For all practical purposes, the speed of response of the light emitting diode is instantaneous, and it can be made in such a way that it is possible to use the diodes without optical focusing systems. It is also apparent that more digital information can be recorded using LEDS as opposed to incandescent lights.

In the June 1972 issue of the Journal of the Society of Motion Picture and Television Engineering, a reprint of a paper by Manfred Stubbe of the Institute fur Rundfurktechnik in Germany was published, presenting a proposal for a standard for recording a time code on 16mm film. This proposal calls for four bits of binary information to be recorded in the space between adjacent sprocket holes of 16mm film.

From the report it appears that experimental cameras with an array of four light emitting diodes mounted somewhere on the aperture plate of the cameras have been produced. The proposed code is arranged to provide a recording of elapsed time in binary coded decimal form once every second. In addition to the time information, there is provision for recording five more decades of freely selectable numbers to be used for other identification purposes. The article gives a fairly complete explanation of how the same information can be recorded on the Neo-pilot track of a ¼ tape recorder and how it can be transferred to an auxiliary track on the magnetic film during the rushes transfer operation. It emphasizes the use of the system as an aid to editing and multi camera filming.

It would seem, however, that the greatest need for this type of device exists in the area of cordless sync shooting, when camera and sound are working independently from their own quartz crystal systems. In the same way, separate clock units can independently provide identical time code pulses in close synchronization over a very long period. Drift of one frame over 10 hours is suggested as typical by Stubbe in his article.

In order to provide a complete time recording every second (every 24 frames when the frame rate is 1/24 sec.), it is, of course, necessary to provide an array of our light emitting diodes in the aperture of the camera plate. This is the only practical way of providing a BCD signal on each frame. In his article, Stubbe suggests the use of four diodes, but the use of four diodes in such an application presents disadvantages in adapting presently available equipment to the system.

In addition, some means must be provided to ensure that the light diodes are energized only during that period of time when the camera mechanism has the film stationary in the gate. If the lights were on during the pull down period, the images would be streaked. This would, of course, confuse the information content of the signal on the film. Synchronization of the light emitting diodes in time with the film's stationary period presents great difficulties with already existing camera equipment and equal difficulties for design in equipment.

In addition, the light from the diodes must be restricted to the edge of the film to avoid unplanned exposure of the picture area of the film.

SUMMARY OF THE INVENTION

In accordance with the instant invention, time indexing information is recorded on a movie film strip in a movie camera by means of at least a single light beam which exposes portions on the edge of the film to produce an indexing coode. The light beam is preferably activated by a cyclical power generator having a period equal to the time duration of at least two frames of the camera, and wherein activating power is applied from the generator to the light beam for no more than one frame duration during each generator period. In this way, a bit of information is produced on one or on no more than both of two adjacent frames. Preferably, a binary one is represented by an exposure on the edge of one or on no more than both of the two adjacent frames, and a binary zero is represented by the non-exposure on the edge of one or no more than both of two adjacent frames.

Apparatus for recording time indexing information on a movie film strip in a camera which comprises a light source with at least one light beam located in the camera in such a way as to be able to expose only portions on the edge of said film comprises a cyclical generator for driving the light source, said generator having a period equal to the time duration of at least two frames of the camera, said generator being adapted to provide activating power to the light source for no more than one frame duration during each period.

Time indexing information is recorded on a corresponding audio tape by means of an audio source driven by a cyclical power generator having the same output characteristics as the output characteristics of the cyclical power generator for the light source.

The invention also contemplates a system for recording synchronized time indexing information on both a movie film strip in a movie camera which comprises a light source with at least one light beam located in said camera in such a way as to be able to expose only an edge of said film, and on a corresponding audio tape by an audio source, said system comprising a separate cyclical power generator as above described for driving the light source and the audio source. A master unit, for calibrating the generators, comprises a further feature of the invention.

In accordance with a preferred embodiment, four light beams are disposed across the film to produce four bits of information in every two frames. Because the beams are disposed across the film, there is still no requirement for synchronization of the light on time with the film stop time. Preferably, again the four light beams are contained in a single light source, such as a four diode LED arrangement.

BRIEF DESCRIPTION OF THE DRAWINGS

The invention will be better understood by an examination of the following description together with the accompanying drawings, in which.

DESCRIPTION OF THE PREFERRED EMBODIMENTS

Figure 1:
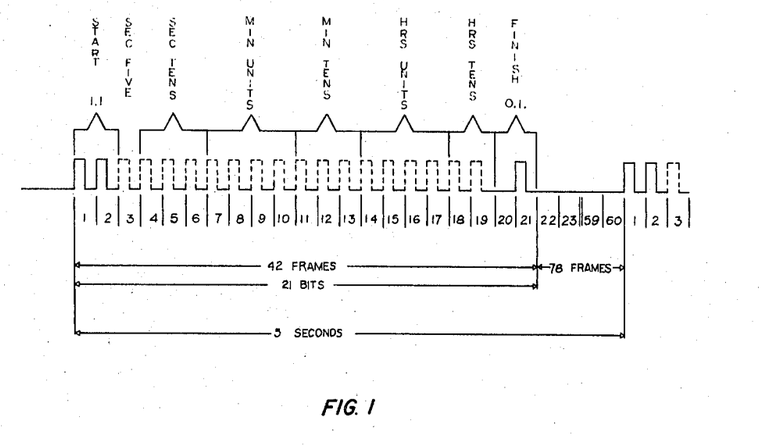
FIG. 1 illustrates a preferred format for the time indexing information.

Referring now to FIG. 1, a preferred format for the time indexing information is shown. As can be seen, in the preferred format the local time of day is indexed once every 5 seconds. The time is given to the closest 5 seconds. It will, of course, be clear that this information could be contained in a smaller or larger time interval, i.e., the time of day could be indexed every 3 seconds or every 10 seconds, etc. However, a 5 second interval is expedient.

The time information is coded in BCD form in the preferred embodiment; however, other codes could be used without departing from the spirit of the invention. In the preferred embodiment, each bit of information occupies a time period equal to the time duration of two frames of the camera and preferably consists of a pulse of one frame time duration followed by an equal empty space of one frame time duration. It will be obvious that the pulse could be narrower than one frame in width, but the width must not exceed one frame. Additionally, each bit could be of more than two frame durations. A binary zero is represented by the absence of a pulse, i.e., a two frame period of blank space is a binary zero.

As can be seen, each 5-second time interval contains 120 frames, assuming a frame rate of 24 frames/sec. This provides space for 60 bits of information. In accordance with the preferred embodiment, the bit spaces are allocated as follows:

The first two bit spaces are occupied by binary ones to indicate the start of a 5 second interval. The third bit indicates the closest 5 seconds of the time of day. Thus, if the time is 9:22:41, a binary zero will occupy the third bit space to indicate that the 5 second mark has not yet been passed. When the time is 9:22:46, the third bit space will be occupied by a 1 to indicate that the 5 second mark in the last 10 second interval has been passed. As this, in effect, gives yes-no type information, only one bit space is needed.

The next three bit spaces (4 to 6) indicate seconds decades in BCD. As only readings from 0 to 5 are required (in 10 second intervals), only three bits are needed for this information.

The spaces 7 and 10 are reserved for minutes units information. There is, of course, a requirement at this place for the numerals 0 to 9 so that four bits are required for this with BCD. Minutes decades are recorded in the spaces 11 to 13, and again, only the numerals 0 to 5 are required. The hours units are recorded in the spaces 14 to 17 and the hours decades in the spaces 18 and 19. As the hours decades require only readings of 0, 1 or 2, only two bits are required.

A binary zero followed by a binary one in spaces 20 and 21 indicates the termination of time information, and two binary zeros in spaces 59 and 60 indicate the end of a 5-second interval. The spaces 22 to 58 are free and can be used to insert other information such as frame numbers or days of the year, etc. In addition, if the remaining spaces are not sufficient for the remaining required information, it is possible to use a time-sharing arrangement whereby only parts of the complete additional number are transmitted by successive pulse groups. In this regard, it is preferable to have large lengths of blank space between information clusters so that each cluster is easily and readily identifiable. If there are only small blank spaces between clusters, it becomes difficult to identify the beginning of an information cluster and to distinguish blank spaces indicating binary zeros (for example, at 10:00:02) from the blank spaces between clusters.

For convenience, bits 1 to 21 will be referred to as a time index word below.

Although one format has been shown, other formats could be used. Thus, the second pulse of the start code could be placed, say, 2 seconds after the first with blank spaces between the pulses. Also, a bit could be three or more frame durations, and a code other than BCD could be used. All of these variations would be within the spirit of the invention.

Figure 2:
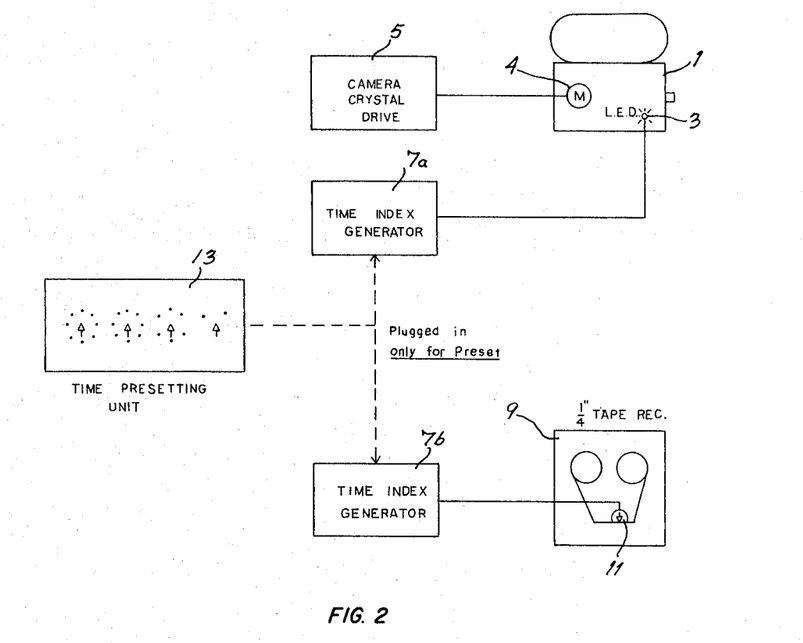
FIG. 2 illustrates, in block diagram form, a synchronized sound-shooting system in accordance with the invention.

Referring now to FIG. 2, a movie camera 1 comprises a light source 3, such as an LED, placed in the camera in such a position as to be able to expose only an edge of the film in the camera, preferably the normal sound track area. The camera motor 4 is controlled by a camera crystal drive 5. A time-index generator 7a, which provides the film indexing signals, drives the light source 3.

A similar generator 7b is connected to the audio head 11 of a tape recorder 9. The audio head could be the Neo-Pilot head on recorders comprising such heads. The output of the generator would be fed to the Pilot-tone input connector. The generator 7b provides coded bursts of a tone frequency. The tone should be at a frequency low enough so as not to interfere with the audio input on the magnetic tape. A frequency of 325 Hz is preferred. Thus, the output of the generator 7b consists of 325 Hz tone bursts, each burst being no more than 1/24 sec. in duration, followed by blank spaces at least 1/24 sec. long. These bursts are superimposed on a 60 Hz signal before being applied to the Neo-Pilot head, as will be seen in the description of FIG. 4.

Before the shooting of a sequence, both generators are preset by calibration unit 13. The time of day, or other indexing information, is set on the dials of the calibration unit, and the information on the dials is inserted into both generators simultaneously so that both generators are preset with the same indexing information. The operation of the calibration unit, and the method of transferring the information in the calibration unit to the generators, will be more fully described below.

Figure 3:
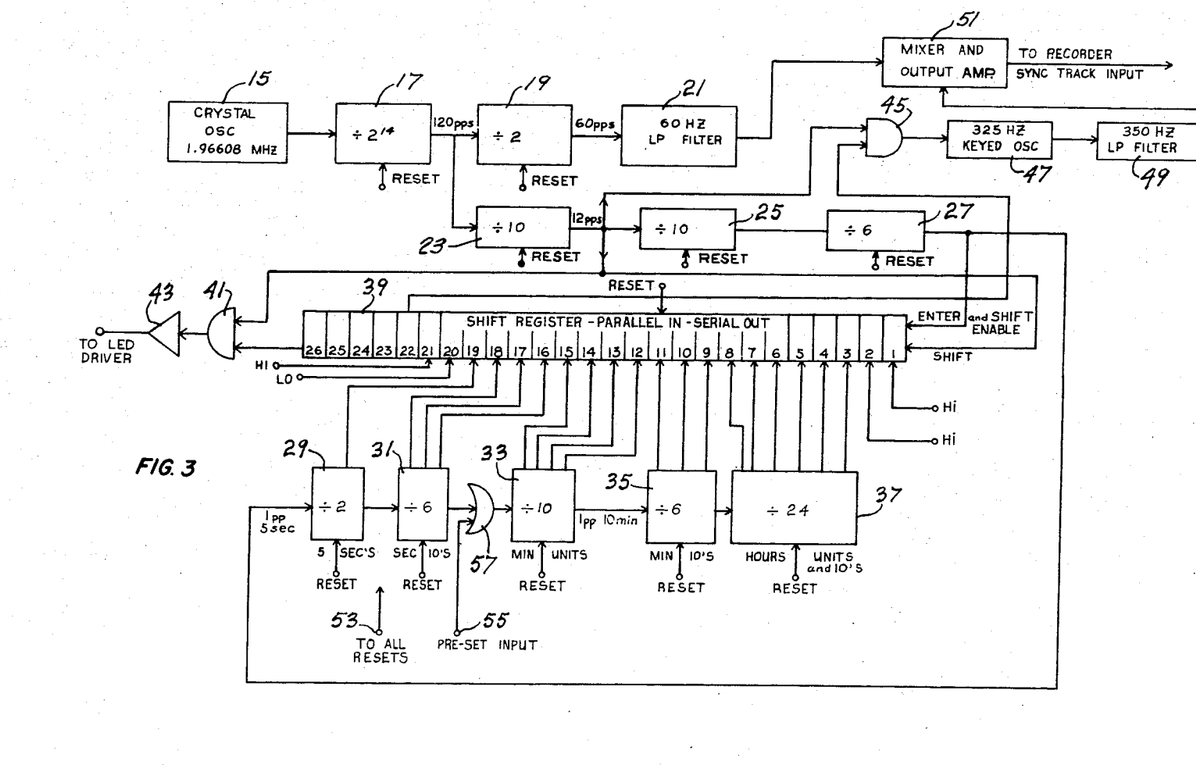
FIG. 3 is a simplified block diagram of a pulse code generator.

The time index generator circuitry, illustrated in FIG. 3, can be used both for the movie camera and the tape recorder, although a separate unit is required for each of the camera and recorder as is illustrated in FIG. 2. In addition, the generator can be adjusted to provide a 60 or 50 Hz synchronizing signal, and it can be adjusted for use with a 24 frame per second or 25 frame per second or 20 frame per second camera.

The generator circuit comprises a crystal oscillator 15. In the case of a camera with a 24 frame per second rate and a 60 Hz synchronizing frequency, the frequency of the oscillator can be 1.96608 MHz. The output of the oscillator is fed to a $2^{14}$ divider 17 to produce a 120 pps output. The divider, as all other dividers in the disclosure, is simply a flip-flop bi-stable circuit as is well known in the art. Dividers of this nature are readily available in IC form and require no further description here.

The 120 pps signal is fed to a divide by 2 counter 19 which is connected to a 60 Hz low pass filter 21 to produce a stable 60 Hz sine wave for the purposes to be described below.

In a parallel path, the 120 pps output is fed to divide by 10 counter 23 to produce a 12 pps output. The 12 pps output is further divided in divide by 10 counter 25 and divide by 6 counter 27 to produce a 1 pp 5 sec. train. This train is then fed to the time counting arrangement consisting of counters 29 to 37 inclusive.

Divide by 2 counter 29 is high every second clock pulse. As the clock pulses arrive one every 5 seconds, this divider provides the 5 second time information. Counter 31 divides the output of 29 by 6 to provide seconds decades data. As can be seen, this is a three stage counter with three outputs to provide numbers from 0 to 5 in BCD.

In the same way, four stage counter 33 counts the minutes units elapsed, and the three stage counter 35 counts the minutes decades. Divide by 24 counter 37 keeps track of the hours units and hours tens elapsed and stores this data.

It can thus be seen that elapsed time is measured in counters 29 to 37 by counting the pulses of the 1 pp 5 sec. pulse train. The elapsed time is also stored in these registers while it is being measured.

The data stored in counters 29 to 37 is transferred to shift register 39 for outputting to the LED driver and recorder sync track as follows: The enter and shift enable terminal of the register is clocked once every 5 seconds with the output from counter 27. When this terminal receives an enter enable pulse, the data from counters 29 to 37 is transferred, in parallel form, to the shift register. The data from the shift register is then clocked out of the register by the shifting action of the 12 pps train from 23 at the shift terminal of the shift register. As is well known in the art, each time a pulse is applied to the shift terminal, the data in the shift register is shifted one stage to the left. High levels are provided initially at stages 1 and 2 of the shift register to indicate the start of a 5-second cycle as per FIG. 1. A low level is included at stage 20, and a high level at stage 21, to indicate the end of a time index word. Thus, the data from the registers 29 to 37 is transferred to the shift register once every 5 seconds. For the remainder of the 5 seconds, data is shifted out of the shift register. After the first 21 shifts, only zeros will be shifted out till the next enter and shift enable pulse arrives.

The 12 pps clocking rate provides the 1 bit per two frame rate when the frame rate is 24 frames per second.

The output of the register is fed, through a delay indicated by the stages 23 to 26 of the register at the left-hand end, to AND gate 41 and amplifier 43 to the LED driver. The reason for the delay will be explained below. The output is gated through gate 41 to ensure that each pulse is no longer than 1/24th of a second by having the second terminal of gate 41 fed with the 12 pps train.

The output of the 22nd stage of the shift register 39 is gated through AND gate 45, which has the same function as gate 45 in the LED circuit, to drive a keyed oscillator 47. Each time the oscillator is activated, it provides a burst of audio signal at 325 Hz. The output of 47 is filtered in low pass filter 49, and the output of the filter is impressed on a 60 Hz carrier in the mixer 51. The modulated waveform is then applied to the tape recorder sync track input.

The reason for having the light source delayed relative to the sound source is as follows: It may not be possible, in all cameras, to have the light source adjacent the frame of the film being exposed through the lens system of the camera. Thus, the light may be adjacent frame 5 when the lens is adjacent frame 1. However, the indexing information will be applied to the magnetic tape on that part of the tape corresponding to frame 1 of the film. It thus is necessary to provide means for bringing the film and tape into sync. This can be done when the data on the magnetic tape is transferred to magnetic film (see the description relating to FIG. 5 below). However, as will be seen below, it is only possible to delay the data at this time. Thus, steps must be taken to ensure that the indexing information on the sound track is always advanced relative to the film index track. In addition, even if the physical situation requires that the film index information is delayed relative to the magnetic tape indexing information, the delay added by the empty stages provides a degree of adjustability which can be added to the equation when synchronizing the indexing information on the magnetic tape with the indexing information on the film.

Although four empty stages were shown in FIG. 3, this was merely for the purpose of illustrating the principle involved and is in no way meant to be restrictive of the invention.

To preset the generator, data is applied to terminals 53 and 55. A clear pulse is first applied to terminal 53 to clear all counters 17 to 37 as well as shift register 39. The calibration information is then applied, from terminal 55 through OR gate 57, to the counter 33. The data is supplied in pulsed serial form, and the pulses are counted and stored in the counters 33 to 37. As the counters merely count the pulses, and not the rate of the pulses, high frequency pulses can be used so that calibration can be accomplished in seconds or fractions of seconds. In the illustrated case, the time of day to the nearest minute is given, but such an arrangement is not a requirement. Thus, the time of day to the nearest second could be transferred, or the time of day to the nearest minute decade could be transferred within the spirit of the invention.

It was noted that the arrangement in FIG. 3 is adapted for use with a camera having a 24 frame per second frame rate, and for a tape recorder requiring a 60 Hz carrier. For use with other cameras or recorders, it is merely necessary to use either a different frequency crystal in the oscillator 15, or to have a different arrangement of dividing registers. Designs of this type are within the competence of one skilled in the art and require no further description here.

Figure 4:
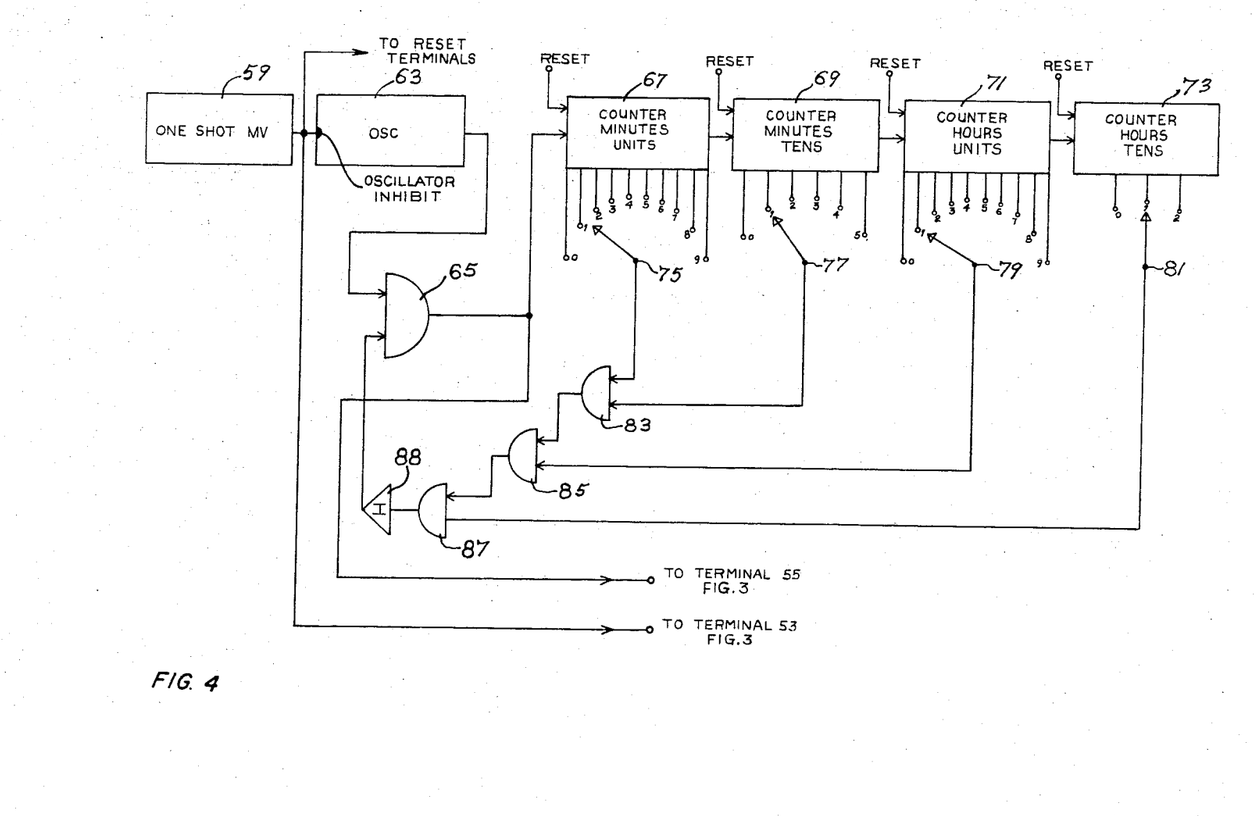
FIG. 4 is a simplified block diagram of a calibration unit for calibrating the pulse code generators.

A block diagram of a calibration unit for presetting the generators is shown in FIG. 4. Referring to FIG. 4, one shot multivibrator 59 is activated only when a start button (not shown) of the calibration unit is pressed. The one shot provides the resetting pulse applied to terminal 53 of FIG. 3 and counters 67 to 73 of FIG. 4. The one shot also inhibits pulse oscillator 63 during the reset period. After the reset period the oscillator provides a continuous train of pulses. The pulses from oscillator 63 are applied to one terminal of AND gate 65 which is initially gated open. From gate 65, the pulse is applied to terminal 55 of FIG. 3. The pulses are also applied to the first counter 67 of a series of counters 67 to 73. The count on the series of counters will be advanced by one each time a pulse is applied to register 67.

The desired preset information is dialed on switches 75 to 81. When the count on the counters 67 to 73 is equal to the count set on the switches, there will be a high level on each arm of each switch. Accordingly, AND gates 83, 85 and 87 will be open, and the output of gate 87, through invertor 88, will close gate 65. Thus, the amount of pulses transferred to terminal 55 will equal the number of pulses required to set the counters 67 to 73 to the state indicated by the switches 75 to 81. This is, of course, equal to the number of pulses required to set the counters 33 to 37 (FIG. 3) to the state indicated by the switches 75 to 81. Thus, the information dialed on the switches is transferred to the generators.

Preferably, operating power for the calibration unit is provided from the power sources of the generators.

Figure 5:
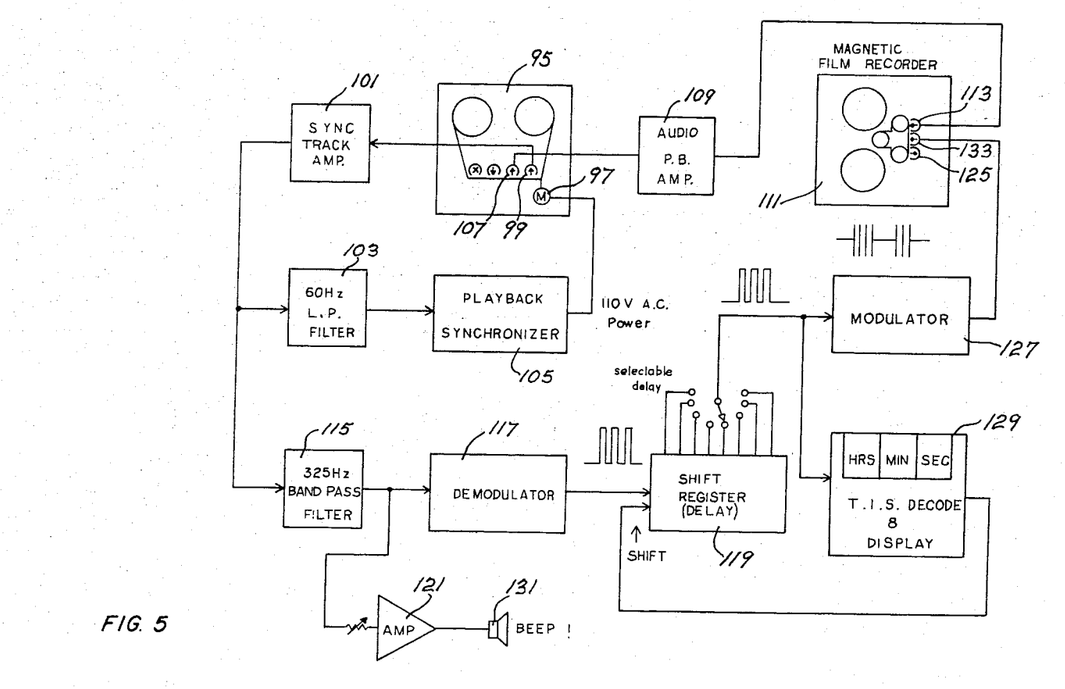
FIG. 5 illustrates a system for transferring indexing information recorded on magnetic tape to magnetic film.

A system for transferring the time indexing information recorded on magnetic tape to magnetic film is shown in FIG. 5. In FIG. 5, a magnetic tape playback unit 95 is driven by motor 97 which is powered by a 110v 60 Hz source. The motor is synchronized to the 60 Hz signal on the sync track. Pick-up head 99 is the sync track head and it picks up the synchronization, and time index signal. From head 99, the signal is fed to sync amplifier 101 and from the amplifier it is fed to the LP filter 103 which passes only the 60 Hz content of the time index signal. The 60 Hz content is passed to the playback synchronizer whose output controls the motor 97. The synchronizer 105 may comprise a unit such as the Magnatech Playback Synchronizer.

The audio signal is picked up by the audio head 107, amplified in amplifier 109, and fed to audio record head 113 of the magnetic film recorder 111.

The time index signal is also fed to the demodulator 117 through the 325 Hz BP filter 115. The output of the demodulator is a pulse train of coded pulses with a period of 1/12th of a second as above described. This is fed to the modulator 127 through the delay shift register 119.

The modulator drives the sync track head 133 of the magnetic film recorder to transfer the time index information to the time index track of the magnetic film.

The delay shift register is required to adjust for the delay of the film index signal relative to the tape index signal as explained above.

The delay of the delay register 119 puts the magnetic film in sync with the movie film. That is, the same time index code will now appear on corresponding frames of both the movie film and the magnetic film. The delay is made variable so that the different delays provided by different cameras can be compensated for equally well by means of a simple selection. The delay selected will, of course, correspond to the delay introduced in the camera being used.

The 325 Hz is also fed, through amplifier 121, to speaker 131 to provide an audible beep each time the tape head 99 passes over a recorded pulse.

The output of the register 119 is also fed to the time index decode and display device 129 to provide a visible display of the time index signal on that part of the magnetic tape presently being transferred.

Figures 6, 9:
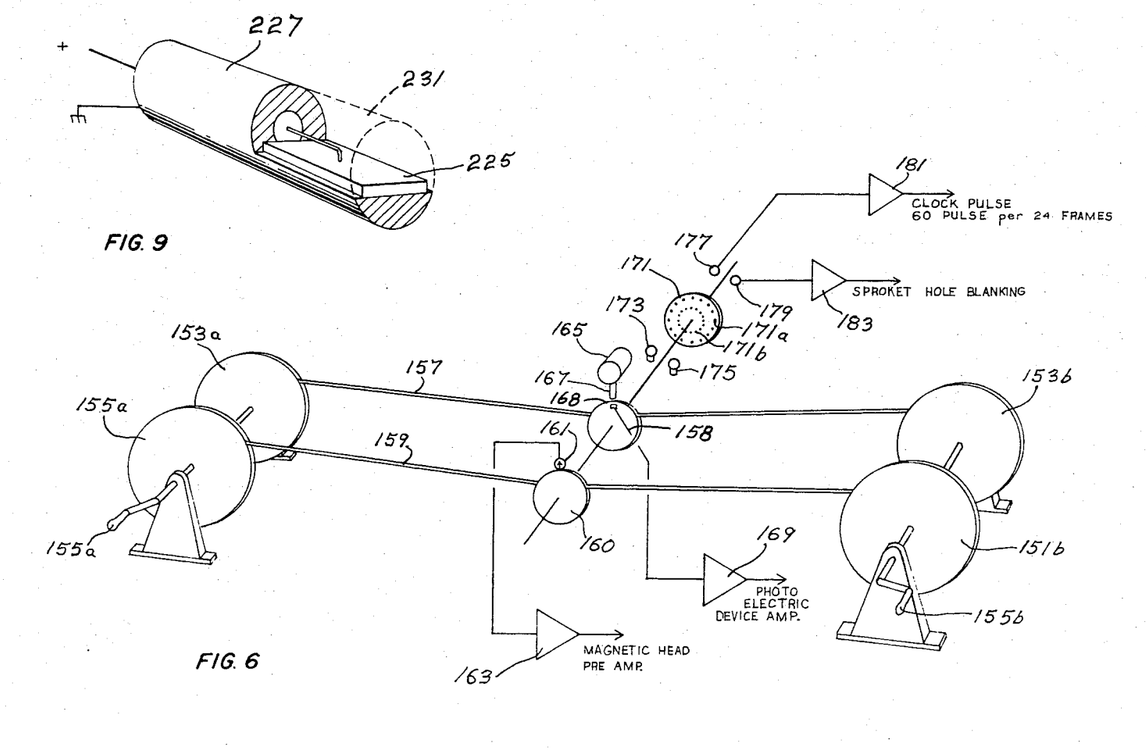
FIG. 6 is a schematic mechanical diagram of an editor's desk equipment modified in accordance with the invention.
FIG. 9 illustrates a mounting device for an LED in accordance with the invention.

FIG. 6 illustrates an editor's desk equipment modified to accommodate movie films and magnetic films produced in accordance with the invention. The equipment comprises magnetic film reels 151a and 151b for winding the magnetic film 159, and movie film reels 153a and 153b for winding the movie film 157. Both reels 151a and 153a are mounted on a common shaft, and reels 151b and 153b are mounted on a separate common shaft. The common shaft for the reels 151a and 153a is attached to a handle 155a, commonly known as a film rewind, and the common shaft of reels 151b and 153b is attached to film rewind 155b. The films can be wound from a reel at one end to a reel at the other by the action of the film rewind, and, of course, both movie and magnetic film will be wound at the same time.

The movie film 157 passes over a sprocket wheel 158 while the magnetic film 159 passes over a sprocket wheel 160. Both these wheels are attached to a common shaft. Magnetic head 161 picks up the time index signal from the magnetic film and passes it, through magnetic head preamplifier 163, to the magnetic film time index detecting and display circuit which will be described with FIG. 8 below. A light source 165 provides a focused light beam through optical system 167 to activate a light sensitive device 168, where the film edge overlaps the sprocket wheel 158. The device 168 is activated in accordance with the time indexing signal on the film 157 to drive the photo-electric device amplifier 169, i.e., the device 169 will provide an output each time there is an exposure in the film which allows light from the source 165 to pass through the film. The amplifier is, in turn, connected to the movie film time detecting and display circuit which will be described with FIG. 7 below.

Also on the common shaft of the wheels 158 and 160 is disc 171. The disc has an outer series of openings 171a which are so spaced that light from the light source 173 will pass through an opening to the light sensitive device 177 and thus activate it 60 times every 24 frames. This output of 177 is fed to the clock pulse amplifier 181. The output of the amplifier provides the clock signal for a counter as will be seen in FIGS. 7 and 8.

An inner series of openings 171b coincides with the sprocket holes on the films to provide, together with light source 175 and light sensitive device 179, a sprocket hole blanking signal at the amplifier 183. The use of this signal will also be explained with the description of FIG. 7 below.

Figure 7:
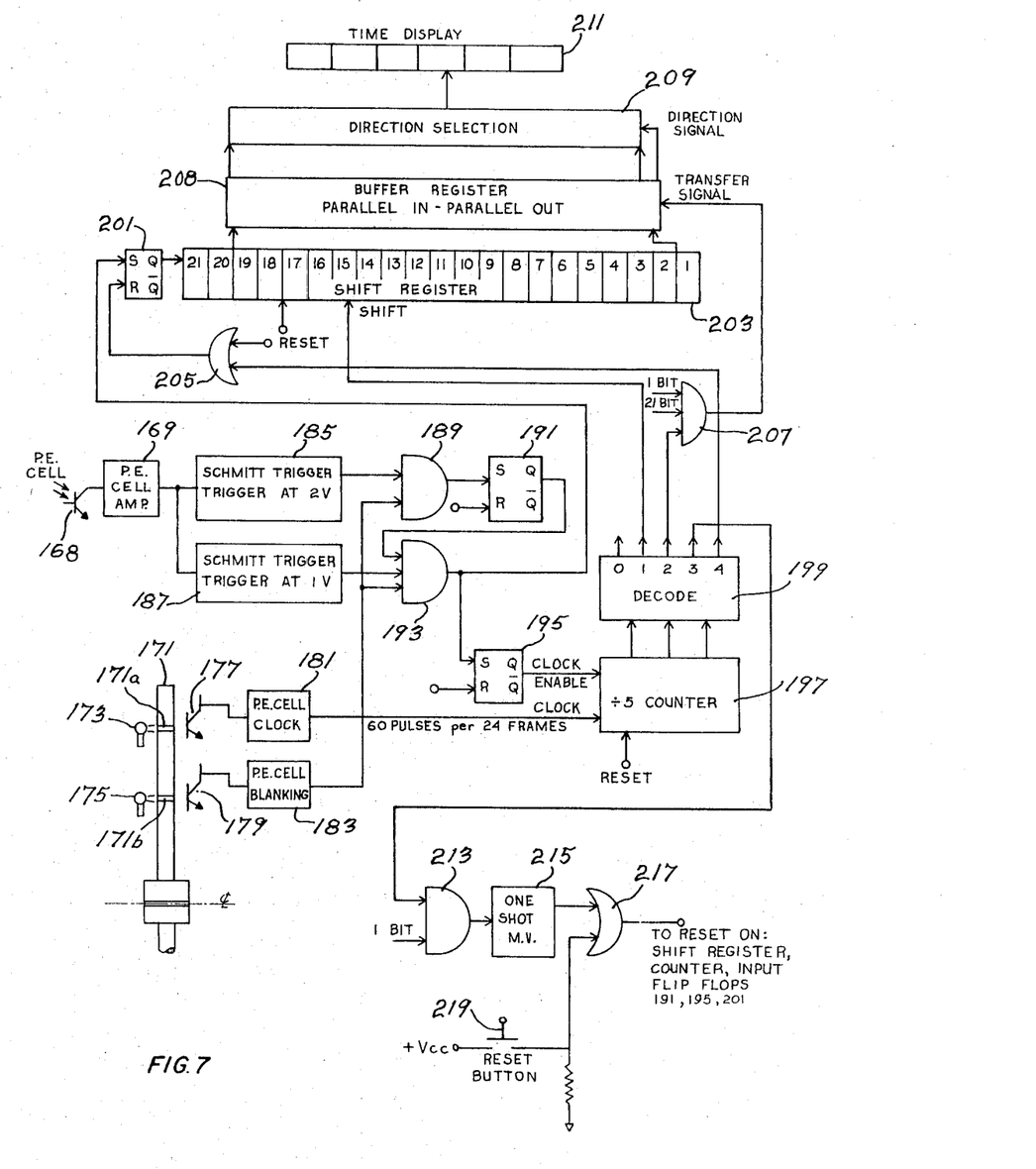
FIG. 7 is a block diagram of the electronic circuitry for detecting the indexing code of the movie film for use with the equipment shown in FIG. 6.

Referring now to FIG. 7, the photo-electric cell 168 is connected to amplifier 169. The output of the amplifier is connected to two Schmitt trigger circuits 185 and 187. Trigger 185 requires a triggering voltage twice as large as does trigger 187. The reason for this arrangement is as follows: In some cases, in an initial frame, the light source in the camera will just begin to turn on, or turn on only very weakly, in the first frame of the first bit. In the second frame of the first bit, it will be fully on. Thus, the exposure in the first frame will be marginal or very weak, but the exposure in the second frame will be strong. When this occurs in the first frame, the further strong exposures will come in the second frame of every bit, and the first frame in every further bit will be weak or marginal. If the counter 197 is activated by the first frame in the first bit, then it will be the first frame of every further bit which will be detected, and it is possible that one or more of the further bits, because of their weakness, will not be detected. By taking the precaution in the first frame of having the stronger exposure initiate the detection, insurance is provided that the stronger exposure frames in further bits will be the frames which are detected. The use of the illustrated arrangement of the triggers 185 and 187 provides this precaution as will be seen below.

Trigger 185 is connected to one terminal of AND gate 189 whose other terminal is connected to the sprocket hole blanking amplifier 183. Gate 189 is normally open to the output from 185, and is only closed when it receives an inhibit pulse from amplifier 183. It will receive such an inhibit pulse whenever a film sprocket passes under the light source 165 (FIG. 6). The use of this blanking arrangement prevents the sprocket holes from appearing as time indexing exposures.

The output of trigger 187 is connected to three-input AND gate 193. One of the other inputs to this gate is supplied from the sprocket hole blanking amplifier 181 for blanking out the sprocket holes. The other input is supplied from set-reset (RS) flip-flop 191. As can be seen, the RS flip-flop 191 will receive a set pulse from the AND gate 189 to provide a high level at its Q terminal whenever Schmitt trigger 185 is activated by a time index pulse.

Gate 193 provides a set pulse to RS flip-flop 195 to set its Q terminal to a high level to thereby enable the counter 197. The clocking pulse for the counter 197 is supplied from the amplifier 181. The clocking rate is 60 pulses per 24 frames.

The arrangement just described operates as follows: If the first frame of the first bit has a weak exposure, the output of cell 168 and amplifier 169 will not be big enough to trigger the trigger circuit 185. It may be large enough to trigger 187, but, as gate 193 is closed, the output of 187 will not go anywhere. When the output of amplifier 169 is big enough to trigger 185, then this trigger will provide a signal to AND gate 189. When this happens outside a sprocket blanking period, gate 189 will open so that flip-flop 191 will be set. This will open gate 193 to signals from trigger 187. As the signal from the amplifier 169 was large enough to trigger 185, it will, of course, be large enough to trigger 187. Therefore, gate 193 will provide a set signal to flip-flop 195 which will enable the counter 197. It is noted that 191 and 195 will remain set, keeping gate 193 open and enabling the counter 197, until they are provided with reset pulses as will be described below. Thus, although a two volt output is required from 169 to initiate the operation, signals as low as one volt will subsequently be detected and counted.

The output of 197 is fed to decoder 199 which provides pulses at its terminals 0-4 in sequence corresponding to the first to fifth clock pulses, and multiples thereof, respectively. Thus, a pulse will appear at terminal 2 of 199 on the second, seventh, 12th, 17th, 22nd, 27th . . . clock pulses, while a pulse will appear on the 0 terminal of 199 on the fifth, 10th, 15th, 20th, 25th . . . clock pulses. As will be clear, the time between pulses on adjacent terminals of 199 is 1/60th of a 24 frame interval, so that a complete cycle of the decode occurs in 1/12th of a 24 frame interval, i.e., the period corresponding to one bit.

The output of gate 193 is also fed to the set terminal of RS flip-flop 201, and when a pulse is fed to the set terminal, it will set the Q terminal of 201 to a high level for inputing to the shift register 203. The terminal 1 output of 199 is fed to the shift terminal of the shift register, while the terminal 4 output is fed to the reset terminal of the flip-flop 201 through OR gate 205. The purpose of the arrangement 168, 169, 185, 187, 189, 191, 193, 195, 197, terminals 1 and 4 of 199, 201 and 205, is to transfer the code on the movie film to the shift register 203. In order to understand how this is done, we will assume that the code 1101 appears on the film, and follow its path through the circuit to see how it gets transferred to the register.

When the strongly exposed portion of the first bit (be it in the first frame or the second frame) is detected by the cell 168 and amplified by the amplifier 169, it will trigger 185 so that flip-flop 191 will be set and open gate 193. At the same time, 187 will be triggered so that flip-flops 195 and 201 will be set. This will enable counter 197 which will begin to count the clock pulses from 181. On the second pulse of the clock pulses of the first 5 pulse cycle, a pulse will be supplied to the shift terminal of register 203 so that the high level on the Q terminal of 201 will be shifted into stage 21 of the shift register. On the fourth pulse of the first cycle, the flip-flop 201 will be reset.

On the fifth pulse of the sequence, i.e., before the first pulse of the second cycle, the second 1 will be detected by the PE cell 169. As 191 remains set, gate 193 will be open to the second pulse. This second pulse will not change the state of 195 as it is already set. However, it will set flip-flop 201. The first pulse of the second cycle will shift the 1 from stage 21 into stage 20 and the high level on the Q terminal of 201 into stage 21. The fourth pulse of the second cycle will reset 201. During the period of the third bit, i.e., the zero bit, the cell 158 will, of course, not provide any output as there will be no exposure on the film. In the period of the third cycle, the flip-flop 201 will not be set and the level on the Q terminal of the flip-flop will remain low. Thus, when a shift pulse is provided on the first pulse of the third cycle, the 1 from stage 20 will be shifted to stage 19, the 1 from stage 21 will be shifted to stage 20, and the 0 from the flip-flop will be shifted to stage 21. The pulse to flip-flop 201 on the fourth pulse of the third cycle will not affect flip-flop 201 as it is already reset.

During the fourth cycle, the 1 in 19 will be shifted to 18, the 1 in 20 will be shifted to 19, the 0 in 21 will be shifted to 20 and the high level on the Q terminal of 201 will be shifted to 21. Thus, after four cycles, the shift register will contain the following data: Stage 21 - 1; stage 20 - 0; stage 19 - 1; stage 18 - 1. By extension of the above, it can be seen that, after 21 cycles, the first stage of the register will contain bit number 1 and stages 2 to 21 will contain bits 2 to 21 respectively.

Terminal 2 of the decoder 199 is fed to three-input AND gate 207 whose other two inputs are fed from the first and 21st stage of the shift register. These stages will contain ones only when a complete index word has been transferred to the shift register. Thus, when the complete word is transferred, the gate 207 will be open to the output from the 2 terminal of 199.

The output of 207 triggers the transfer terminal of buffer register 208 to enable the parallel transfer of bits 2 to 19 from the register 203 to the buffer 208. The second bit is a direction indicating pulse as can be seen from FIG. 1. If the film is being reeled in a forward direction, the second bit will contain a 1. If it is being reeled in the reverse direction, then stage 2 will contain bit 20, i.e., a 0. The direction bit is fed to the control terminal of the direction selector and the contents of the buffer are transferred to the direction selector where they are decoded taking into account the direction of the reeling, to provide a drive signal for the time display device 211. The display device will, of course, display the index signal of that part of the film being processed.

AND gate 207 requires control signals from the first and 21st stage of the register to ensure that there is a complete word in the register before the transfer to the display device is initiated. If the gate 207 were opened with a signal from only the first stage, it would be possible that a nonsense word could be transferred to the display. Nevertheless, it is necessary that whenever stage 1 is filled, a new word be started whether stage 21 is filled or not. In order to ensure this, the output of terminal 3 of 199 is fed to AND gate 213 whose other input terminal is fed from the first stage of the register. Output from the gate 213 triggers one shot multivibrator 215 which then provides a reset signal to the shift register 203, the counter 197, and the input flip-flops 191, 195 and 201. With all of these registers empty, the system is ready to start receiving a new word.

It is noted that the transfer signal is supplied after the shift signal to ensure that all the bits of a word are shifted into the register before the contents of the register are transferred to the buffer. Also, the reset pulse being supplied from terminal 4 of the decoder ensures more efficient operation as the reset pulse is not required if the register contents are to be transferred or if all registers are to be cleared.

Figure 8:
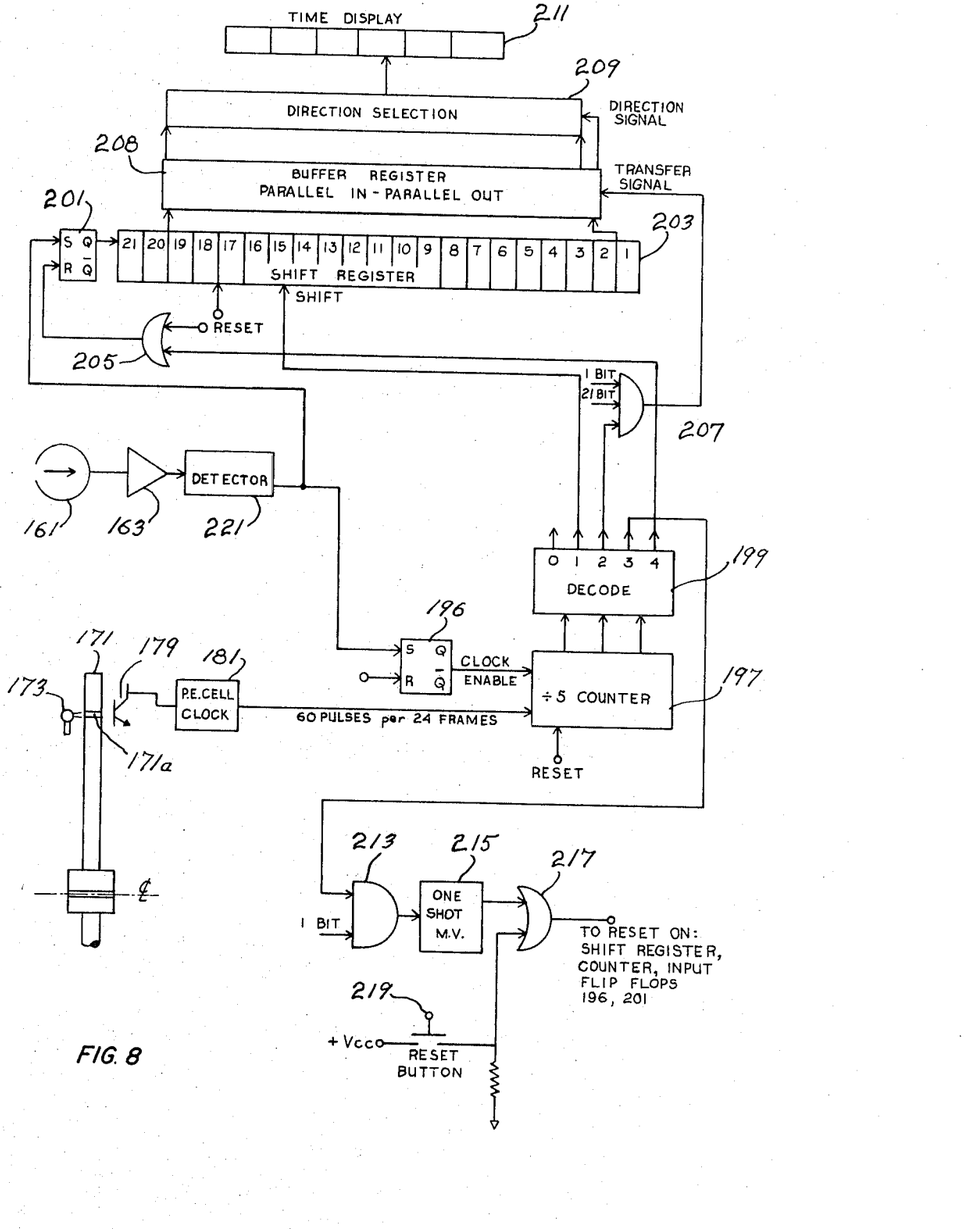
FIG. 8 is a block diagram of the electronic circuitry for detecting the indexing code on the magnetic film for use with the equipment shown in FIG. 6.

Referring now to FIG. 8, it is seen that the index code on the magnetic film is picked up by pick-up head 161. The signal is amplified in amplifier 163 and detected in detector 221. Of course, no blanking pulse is required with magnetic film as the head will not detect the sprocket holes. The remainder of the system operates in the same way as does the movie film circuit and will, therefore, not be further discussed.

FIG. 9 shows a preferred light source mounting arrangement. An LED 225 is mounted in an aluminum rod 227 and is preferably encased in black epoxy material 231. The entire assembly is then mounted in an appropriate position in the camera to expose one edge of the film as has been described.

The density of information for every two frames can be increased by replacing the single light beam with a plurality of light beams disposed to expose portions on the edge of the film to produce an indexing code. The light beams are arranged across the film, i.e., perpendicular to the direction of travel of the film, as compared to the Stubbe system wherein the light sources are disposed in the direction of travel of the film. Thus, in accordance with this further embodiment, a plurality of parallel-line exposures which run in the direction of the film travel would be produced.

The plurality of beams can be produced by either a plurality of light sources arranged across the film, or by having a single source which can produce a plurality of light beams similarly arranged across the film.

Because the plurality of light sources are arranged across the film, it is still not necessary to synchronize the on time of the light beams with the stationary period of the film. Thus, one of the serious disadvantages of the Stubbe system is overcome.

Figure 10:
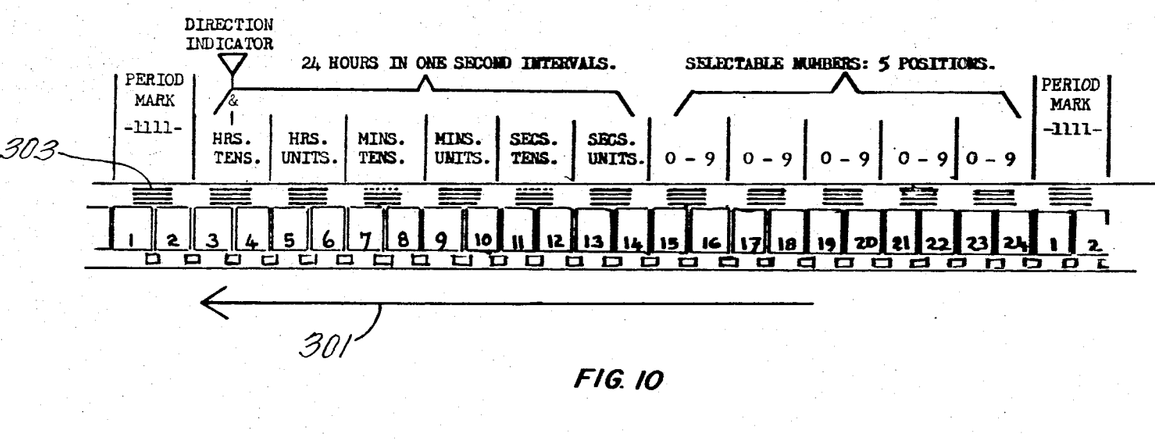
FIG. 10 illustrates a portion of a film having the edge portion thereof exposed by four light beams as well as a preferred format when using the four light beam system.

Although any number of light beams can be used, in accordance with a preferred embodiment, four beams are used to provide a four track time index system. FIG. 10 illustrates a part of a film which has been exposed by such a four track system. Again, a non-exposure will indicate a 0, and an exposure indicates a 1. In FIG. 10, the arrow 301 indicates the direction of travel of the film and 303 are exposure lines on the film. Although the drawing shows four exposed lines in each two frames, it is understood that this is for illustration only, and in a practical situation, the 0 bits will contain unexposed areas. As can be seen, enough information is contained in a two frame interval to provide the hours units information with the plural beam system. This is compared to an eight frame spacing which is required by a single beam system. Thus, with the system, it is possible to provide 24 hour time markings in one second intervals as compared with the 5 second intervals required by the one beam system.

In addition, there is space left over for five selectable numbers in frames 15 to 24.

In order to provide a definite indication of the start of a time marking segment, the period intervals, surrounding the time marking segments, are indicated by binary 15 (1111). This binary number is then, of course, excluded from use within the time marking segments and the selectable number segments.

In accordance with the preferred embodiment of a format using the four beam system, the forward direction is indicated by binary 12, 13 or 14 in the pair of frames representing hours tens. Thus, the binary numbers 1100, 1101 and 1110 represent the decimal numbers 0, 1, or 2 respectively, in the hours tens pair of frames. When a reading device detects either of the binary numbers 1100, 1101 or 1110 after it has detected the binary number 1111, it is aware that the film is moving in the forward direction.

In the reverse direction, frames 23 and 24 contain decimal numbers 0 to 9, that is, binary numbers 0000 to 1001. Thus, when a reading device detects any of the ten binary numbers above after it has detected the binary number 1111, it will know that the film is moving in the reverse direction.

As with the single beam system, most existing cameras can be adapted to the four beam system. Except for a logic circuit to appropriately switch the four beams on and off in the four beam system, the circuitry and structure of the four beam system can be identical to the circuitry and structure of the one beam system.

In order to synchronize the film with the audio tape, it is merely necessary to provide a four bit serial code, corresponding to the four bit code on the film, on the audio tape. Means for providing the serial code are well known in the art, and there is enough tape space for inserting this code on the tape as we have a space corresponding to two frames on the film for the four bit code.

Figure 11:
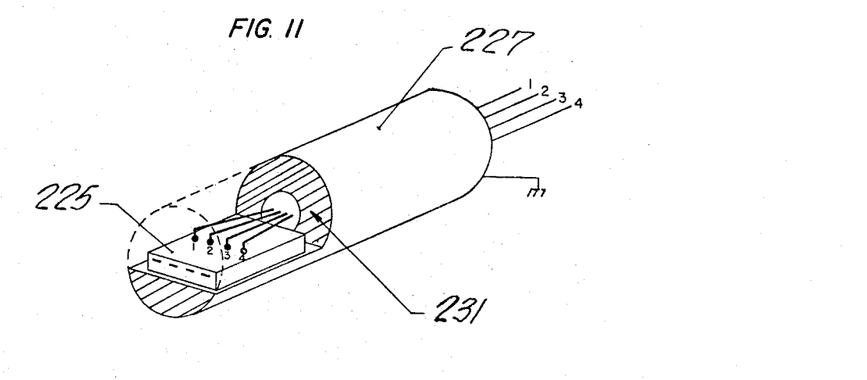
FIG. 11 illustrates a mounting device for an LED providing four beams of light.

FIG. 11 illustrates a design for providing four light beams on an LED. The reference numerals in FIG. 11 correspond to the reference numerals in FIG. 9.

Although preferred embodiments have been described in the foregoing, this was for the purpose of illustrating, but not limiting, the invention. Various modifications which will come readily to the mind of one skilled in the art will come within the scope of the invention as defined in the appended claims. I claim:

1. A method for recording indexing information on a movie film strip in a movie camera by means of at least a single light beam which exposes portions on the edge of the film to produce said indexing information;
said camera having a frame rate and a corresponding frame period during operation of the camera;
said method comprising;
driving the light source with a cyclical power generator having a period equal to at least two frame periods, turning on the light source for a period of no more than one frame period during each period of the generator, the light source being turned off for a period equal to at least one frame period during each period of the generator;
whereby each bit of indexing information is produced on one, or no more than two, adjacent frames of the film strip;
and wherein the indexing information is coded in binary code.

2. A method as defined in claim 1, wherein a binary one is represented by an exposure on the edge of one, or no more than two, adjacent frames and a binary zero is represented by non-exposure on the edge of two adjacent frames.

3. A method as defined in claim 1, wherein said indexing information is indicative of elapsed time.

4. A method as defined in claim 1, wherein said indexing information has a bit rate of 12 bits per second; and wherein each indexing word is 60 bits long.

5. A method as defined in claim 1, and comprising a plurality of light beams, said light beams being disposed across the film, whereby four bits of information are produced in every two frames of said film.

6. A method as defined in claim 1, and comprising four light beams contained in a single source disposed across said film, whereby four bits of information are produced in every two frames of said film.

7. A movie camera adapted to produce indexing information on the edge of a film strip being exposed in said camera;
said camera having a frame rate and a corresponding frame period during operation of said camera;
characterized in that said camera comprises a light source with at least one light beam located in said camera in such a position as to be able to expose only portions on an edge of a film in said camera whereby to record indexing information on said film;
and further characterized in that said camera comprises a time indexing generator;
said generator comprising:
means for producing a cyclical output for driving said light source, and having a period equal to at least two frame periods;
said means providing activating power to said light source for a period of no more than one frame period during each period thereof.

8. A camera as defined in claim 7, wherein said generator further comprises:
a crystal oscillator for producing a first stable frequency;
means for reducing said stable frequency to a lower timing frequency, said means producing a train of timing pulses at said timing frequency;
counting means for counting the timing pulses to thereby measure elapsed time;
a shift register for storing the count of said counting means on a predetermined signal;
said shift register comprising output means for presenting the stored count to said light source in serial form;
whereby said indexing information comprises elapsed time.

9. A camera as defined in claim 8, wherein the elapsed time indicated by said indexing information is indicative of elapsed time to the closest five seconds; and wherein said timing frequency is equal to one pulse per 5 seconds.

10. A camera as defined in claim 9, wherein the frame rate is 24 frames per second;
and where the indexing information is presented in binary form with a bit rate of 12 bits per second;
each word of said indexing information comprising 60 bits;
said generator further comprising means for transferring the count in said counting means to said shift register in parallel form once every 5 seconds;

and a source of pulses having a frequency of 12 pulses per second for shifting said data out of said shift register between the transfer operations.

11. A movie camera as defined in claim 7, wherein said light source comprises four separate beams of light disposed across said film whereby four bits of information are produced in every two frames of said film.

12. A movie camera as defined in claim 7, and comprising four separate light sources, each light source comprising a single beam of light, said light sources being disposed across said film, whereby four bits of information are produced in every two frames of said film.

* * * * *